United States Patent
Kruglick et al.

(10) Patent No.: US 10,042,621 B2
(45) Date of Patent: Aug. 7, 2018

(54) MIGRATION OF EXECUTING PROCESSES

(71) Applicant: Empire Technology Development LLC, Wilmington, DE (US)

(72) Inventors: Ezekiel Kruglick, Poway (CA); Kevin S. Fine, Yverdon-les-Bains (CH)

(73) Assignee: Empire Technology Development LLC, Wilmington, DE (US)

( * ) Notice: Subject to any disclaimer, the term of this patent is extended or adjusted under 35 U.S.C. 154(b) by 443 days.

(21) Appl. No.: 14/379,630

(22) PCT Filed: Aug. 8, 2013

(86) PCT No.: PCT/US2013/054090
§ 371 (c)(1),
(2) Date: Aug. 19, 2014

(87) PCT Pub. No.: WO2015/020655
PCT Pub. Date: Feb. 12, 2015

(65) Prior Publication Data
US 2016/0216951 A1    Jul. 28, 2016

(51) Int. Cl.
*G06F 9/45* (2006.01)
*G06F 9/30* (2018.01)
*G06F 9/455* (2018.01)
*G06F 15/80* (2006.01)
*G06F 8/41* (2018.01)

(52) U.S. Cl.
CPC ............ *G06F 8/41* (2013.01); *G06F 9/30145* (2013.01); *G06F 9/4552* (2013.01); *G06F 15/80* (2013.01)

(58) Field of Classification Search
None
See application file for complete search history.

(56) References Cited

U.S. PATENT DOCUMENTS 5,835,773 A * 11/1998 Dunn ...................... G06F 8/443
                                                                717/146
5,999,734 A * 12/1999 Willis ...................... G06F 8/10
                                                                709/200

(Continued)

FOREIGN PATENT DOCUMENTS

EP       2065805 A1      6/2009

OTHER PUBLICATIONS

"AMD Changes Compute Landscape as the First to Bridge Both x86 and ARM Processors for the Data Center," accessed at http://web.archive.org/web/20130223011212/http://www.seamicro.com/node/304, accessed on Oct. 29, 2012, pp. 4.

(Continued)

*Primary Examiner* — Lewis A Bullock, Jr.
*Assistant Examiner* — Bruce S Ashley
(74) *Attorney, Agent, or Firm* — IP Spring (57) ABSTRACT

In one example embodiment, live migration in a datacenter may include JIT compiling a process that is configured to be executed on both a source instruction set architecture and a destination instruction set architecture, mapping variables and address stacks of the process on both the source instruction set architecture and the destination instruction set architecture into a labeled form thereof, and mapping the labeled form of the variables and address stacks onto the destination instruction set architecture.

8 Claims, 4 Drawing Sheets

(56) References Cited

U.S. PATENT DOCUMENTS

| | | | |
|---|---|---|---|
| 7,640,153 B2 * | 12/2009 | Bala | G06F 9/45516 703/20 |
| 9,098,355 B2 * | 8/2015 | Chen | G06F 9/4552 |
| 9,405,561 B2 * | 8/2016 | Giroux | G06F 9/443 |
| 2011/0179415 A1 | 7/2011 | Donnellan et al. | |
| 2012/0297163 A1 * | 11/2012 | Breternitz | G06F 9/5066 712/22 |
| 2012/0311568 A1 | 12/2012 | Jansen | |
| 2012/0324443 A1 | 12/2012 | Low et al. | |
| 2015/0145871 A1 * | 5/2015 | Parker | G06T 1/20 345/505 |

OTHER PUBLICATIONS

"Clang: a C language family frontend for LLVM," accessed at http://web.archive.org/web/20130806073530/http://clang.llvm.org/, accessed on Aug. 4, 2014, pp. 2.

"LLVM," accessed at http://web.archive.org/web/20130425040050/http://en.wikipedia.org/wiki/LLVM, accessed on Aug. 4, 2014, pp. 8

"Programming Language Popularity," accessed at http://web.archive.org/web/20130805071019/http://langpop.com/, accessed on Aug. 4, 2014, pp. 6.

"PyPy—The RPython Toolchain," accessed at http://web.archive.org/web/20130702101644/http://doc.pypy.org/en/latest/translation.html, accessed on Aug. 4, 2014, pp. 13

"PyPy Speed Center," Accessed at http://web.archive.org/web/20130805144218/http://speed.pypy.org/, Accessed on Aug. 4, 2014, pp. 3.

"PyPy," accessed at http://web.archive.org/web/20130805063409/http://pypy.org/, accessed on Aug. 4, 2014, p. 1.

"The LLVM Compiler Infrastructure," accessed at http://web.archive.org/web/20130807165910/http://llvm.org/Users.htmlm accessed on Aug. 4, 2014, pp. 5

"TILE64 Processor," accessed at http://web.archive.org/web/20130201084728/http://www.tilera.com/products/processors/TILE64, accessed on Aug. 4, 2014, pp. 2.

Aroca, R. V., and Gonçalves, L. M. G., "Towards Green Data Centers: A Comparison of X86 and ARM Architectures Power Efficiency." Journal of Parallel and Distributed Computing, vol. 72, No. 12 pp. 1770-1780 (Dec. 2012).

Chun, B. et al., "An energy case for hybrid datacenters," ACM SIGOPS Operating Systems Review, vol. 44, No. 1, pp. 76-80 (2010).

Constantin, L., "Russian startup working on x86-to-ARM software emulator," accessed at http://web.archive.org/web/20130525025359/http://www.computerworld.com/s/article/9232222/Russian_startup_working_on_x86_to_ARM_software_emulator, accessed on Aug. 4, 2014, pp. 4.

Epstein, Z., "Samsung unveils Galaxy S3's new quad-core processor," accessed at http://web.archive.org/web/20130517220353/http://bgr.com/2012/04/26/samsung-unveils-galaxy-s3s-new-quad-core-processor/, accessed on Aug. 4, 2014, pp. 6.

Higginbotham, S., "Red Hat-Applied Micro deal is another vote for ARM in the data center," accessed at http://web.archive.org/web/20121203165320/http://gigaom.com/cloud/red-hat-applied-micro-deal-is-another-vote-for-arm-in-the-data-center/, accessed on Aug. 4, 2014, pp. 10.

International search report and written opinion for PCT application No. PCT/US2013/54090 dated Apr. 21, 2014.

Johnson, M., "Intermediate Representation," Handout 16, revised by Zelenski, J., pp. 1-8 (Jul. 2008).

Krioukov, A., et al., "NapSAC: design and implementation of a power-proportional web cluster," Proceeding Green Networking '10 Proceedings of the first ACM SIGCOMM workshop on Green networking, pp. 15-22 (2010).

Larabel, M., "Building the Linux Kernel With LLVM/Clang Continues," accessed at http://web.archive.org/web/20130507101611/http://www.phoronix.com/scan.php?page=news_item&px=MTE3MTc, accessed on Aug. 29, 2012, pp. 2.

Larabel, M., "China Makes a Java Version of Core LLVM," accessed at http://web.archive.org/web/20130514094325/http://www.phoronix.com/scan.php?page=news_item&px=MTIxMDM, accessed on Aug. 4, 2014, pp. 2.

Mishra, A. K et al., "Towards characterizing cloud backend workloads: insights from Google compute clusters," ACM SIGMETRICS Performance Evaluation Review, vol. 37, No. 4, pp. 34-41 (Mar. 2010).

Rath, J., "Tilera and Maipu Introduce 512-Core Router," accessed at http://web.archive.org/web/20130605113553/http://www.datacenterknowledge.com/archives/2012/05/08/tilera-and-maipu-introduce-512-core-router/, accessed on Aug. 4, 2014, pp. 2.

Rauch, M.et al., "Dynamic adaptive power management for—and by-a Java virtual machine," Donald Bren School of Information and Computer Science, pp. 1-10 (2006).

Shah, A., "Calxeda joins the 64-bit ARM server chip race," IDG News Service, accessed at http://www.networkworld.com/article/2160786/computers/calxeda-joins-the-64-bit-arm-server-chip-race.html, accessed on Oct. 17, 2012, pp. 2.

Shimpi, A. L., "Intel Plans on Bringing Atom to Servers in 2012, 20W SNB Xeons in 2011," accessed at http://web.archive.org/web/20130602024900/http://www.anandtech.com/show/4222/intel-plans-on-bringing-atom-to-servers-in-2012-20w-snb-xeons-in-2011, accessed on Aug. 4, 2014, pp. 5.

Silberman, G. M., and Ebcioglu, K., "An Architectural Framework for Supporting Heterogeneous Instruction-set Architectures," Computer, vol. 26, No. 6, pp. 39-56 (1993).

Singh, G., "Energy-Proportioned Computing: Reshaping the Server CPU Landscape," accessed at http://web.archive.org/web/20130601161515/http://www.apm.com/media/blog/energy_proportioned_computing_reshaping_the_server_cpu_landscape/, accessed on Aug. 4, 2014, pp. 3.

Svanfeldt-Winter, O., et al., "Cost and Energy Reduction Evaluation for ARM Based Web Servers," 2011 IEEE Ninth International Conference on Dependable, Autonomic and Secure Computing (DASC), pp. 480-487 (2011).

Wood, T., "Improving Data Center Resource Management, Deployment, and Availability with Virtualization," Computer Science, pp. 1-49 (2009).

"HC24-K3: The Cloud Transforms IT, Big Data Transforms Business," accessed at https://www.youtube.com/watch?v=7SN3EogQKas, Sep. 14, 2012, pp. 1-2.

"Numba Python bytecode to LLVM translator," accessed at https://www.youtube.com/watch?v=WYi1cymszqY, Aug. 2, 2012, pp. 1-2.

* cited by examiner

MIGRATION OF EXECUTING PROCESSES

CROSS-REFERENCE TO RELATED APPLICATION

This application is a U.S. National Stage Entry under 35 U.S.C. § 371 of International Application No. PCT/US2013/054090, filed on Aug. 8, 2013.

TECHNICAL FIELD

The embodiments described herein pertain generally to migrating currently executing applications between platforms.

BACKGROUND

Unless otherwise indicated herein, the approaches described in this section are not prior art to the claims in this application and are not admitted to be prior art by inclusion in this section.

With the proliferation of cloud-based computing, datacenters are responsible for providing efficient processing of extraordinary amounts of tasks for a continuously expanding number of clients. Thus, datacenters are burdened with the need to balance power usage, hardware duty loads, resource load, etc.; in other words, in order to efficiently and effectively carry out their processing mission, datacenters need to continuously pursue improved load balancing solutions. As an example of such solutions, datacenters are diversifying in terms of the types of architectures that are executed and supported therein. For example, the processors therein may implement different types of instruction set architectures (ISA) based on processing needs, e.g., speed vs. strength.

SUMMARY

In one example embodiment, a method of live migration in a datacenter, may include JIT (just-in-time) compiling a process that is configured to be executed on both a source instruction set architecture and a destination instruction set architecture, mapping variables and address stacks of the process on both the source instruction set architecture and the destination instruction set architecture into a labeled form thereof, and mapping the labeled form of the variables and address stacks onto the destination instruction set architecture.

In another example embodiment, a method of migrating a process may include compiling a process as it executes on a first instruction set architecture, generating a function map for at least some functions of the process as the process executes on the first instruction set architecture, generating a variable map for at least some variables of the process as the process executes on the first instruction set architecture, mapping the functions from the function map to a function stack of the process, and mapping the variables from the variable map to corresponding addresses of the process on a second instruction set architecture.

In yet another example embodiment, a non-transitory computer-readable medium may store executable instructions that, when executed, may cause a virtual machine manager to JIT compile at least a process of a thin binary that may be executed on a first platform and a second platform, dereference function addresses and a function stack for at least the process of the thin binary, dereference variable addresses for at least the process of the thin binary, and generate function maps to connect functions and variables corresponding to the thin binary representation of the process to equivalent pointers and addresses on both the first platform and the second platform.

In still another example embodiment, a non-transitory computer-readable medium may store executable instructions that, when executed, may cause one or more processors to migrate an executing application by collecting, into a collection of function maps, low-level dictionary hash tables from both a first instruction set architecture and a second instruction set architecture that may both execute at least a process included in a thin binary; collecting, into a collection of variable maps, low-level renaming hash tables from both the first instruction set architecture and the second instruction set architecture; transferring function stacks from the first instruction set architecture to the second instruction set architecture based on the function maps; and transferring variables from the first instruction set architecture to the second instruction set architecture based on the variable maps.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Figure 1:
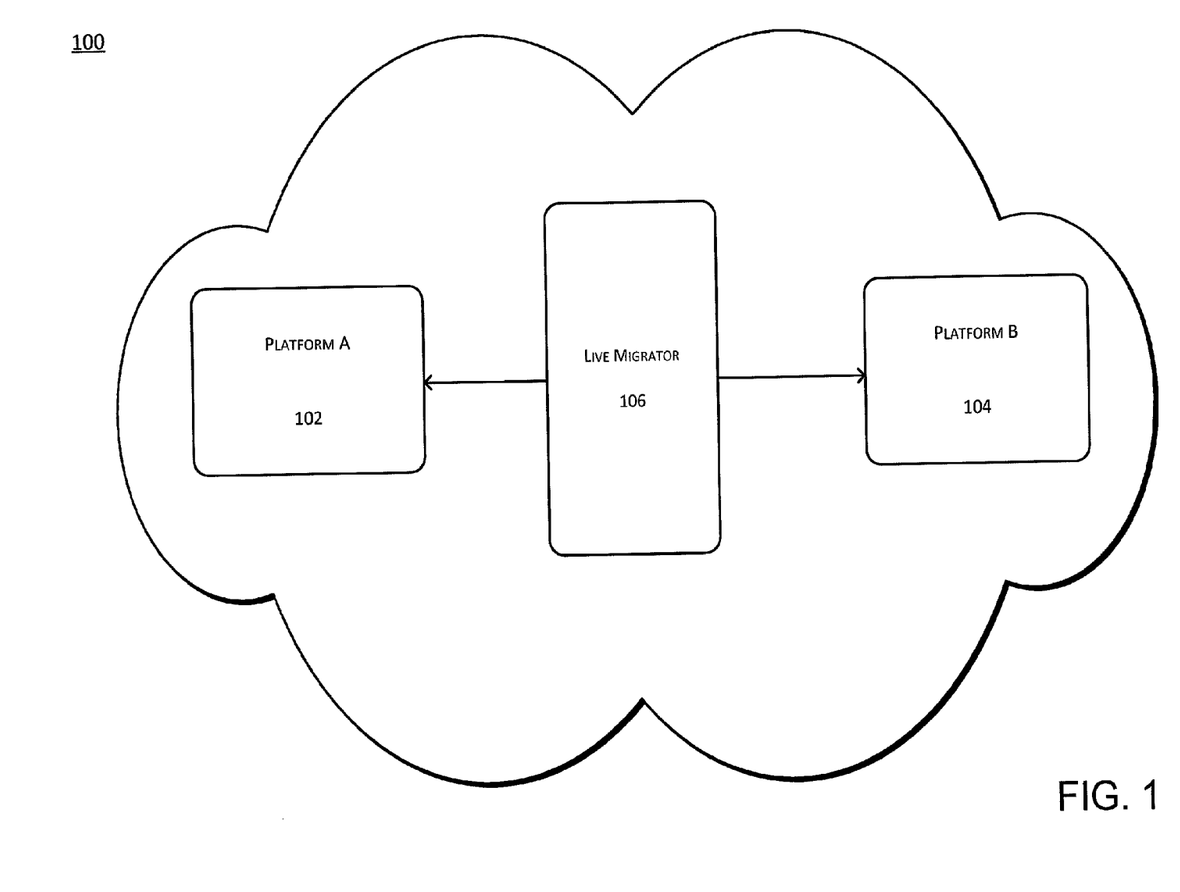
FIG. 1 shows an example datacenter framework in which migrating executing processes may be implemented, arranged in accordance with at least some embodiments described herein.

FIG. 1 shows an example datacenter framework 100 in which migrating executing processes may be implemented, arranged in accordance with at least some embodiments described herein. As depicted, datacenter framework 100 may represent a cloud computing environment and includes a platform A 102, a platform B 104, and a live migrator 106.

Platform A 102 and platform B 104, which may or may not be included in the same hardware infrastructure, may both represent platforms that are configured to execute applications using a respective instruction set architecture (ISA) that differ from each other. As referenced herein, a platform may refer to a software, or even hardware, architecture; and therefore, either or both may be contemplated for the embodiments described herein. In accordance with the embodiments described herein, an application that is executing on platform A 102 may be migrated to platform B 104. Thus, whether the ISA is one of, e.g., x86, Advanced RISC Machines (ARM), or Tilera, the example embodiments described herein may include migration of running (executing) processes among different ISAs so as to improve performance when, for example, virtual machines (VMs) are not at peak demand. Such migration may be alternatively referred to as live migration.

Live migrator 106 may refer to a component or module on the hypervisor level that is configured, programmed, or otherwise designed to facilitate live migration of at least an executing process of an application or program from one instruction set architecture to another. To do so, live migrator 106 may host or otherwise queue function maps and/or variable maps that provide links of respective function and variable values to respective names in a thin binary thereof that is provided to both platform A 102 and platform B 104.

As referenced herein, an instruction set architecture (hereafter "ISA") may refer to an interface between the programming language for the processes of an application or program executing on the respective platform and the physical hardware that executes the respective processes. The ISA for a respective one of platform A 102 and platform B 104 may include native data types, instructions, registers, addressing modes, memory architecture, interrupt and exception handling, and an external I/O.

As further referenced herein, on a general level, compiling may refer to a function or an operation of translating an application or program in or from a high-level programming language into machine language. More particularly, as referenced herein, a just-in-time (JIT) compiler may refer to a software component or module that is configured, programmed, or otherwise designed to convert application or program source code into native machine code, just prior to the application or program being executed, i.e., "just in time."

Various example embodiments described herein exploit low-level databases, which are backend elements of, e.g. JIT compilers, to map names to objects. Because the names of variables and functions are the same in a thin binary that is executed on a source ISA and a destination or target ISA, such low-level databases may be utilized to map variables and address stacks from the source ISA into a labeled form, and then subsequently onto the destination or target ISA.

Figure 2:
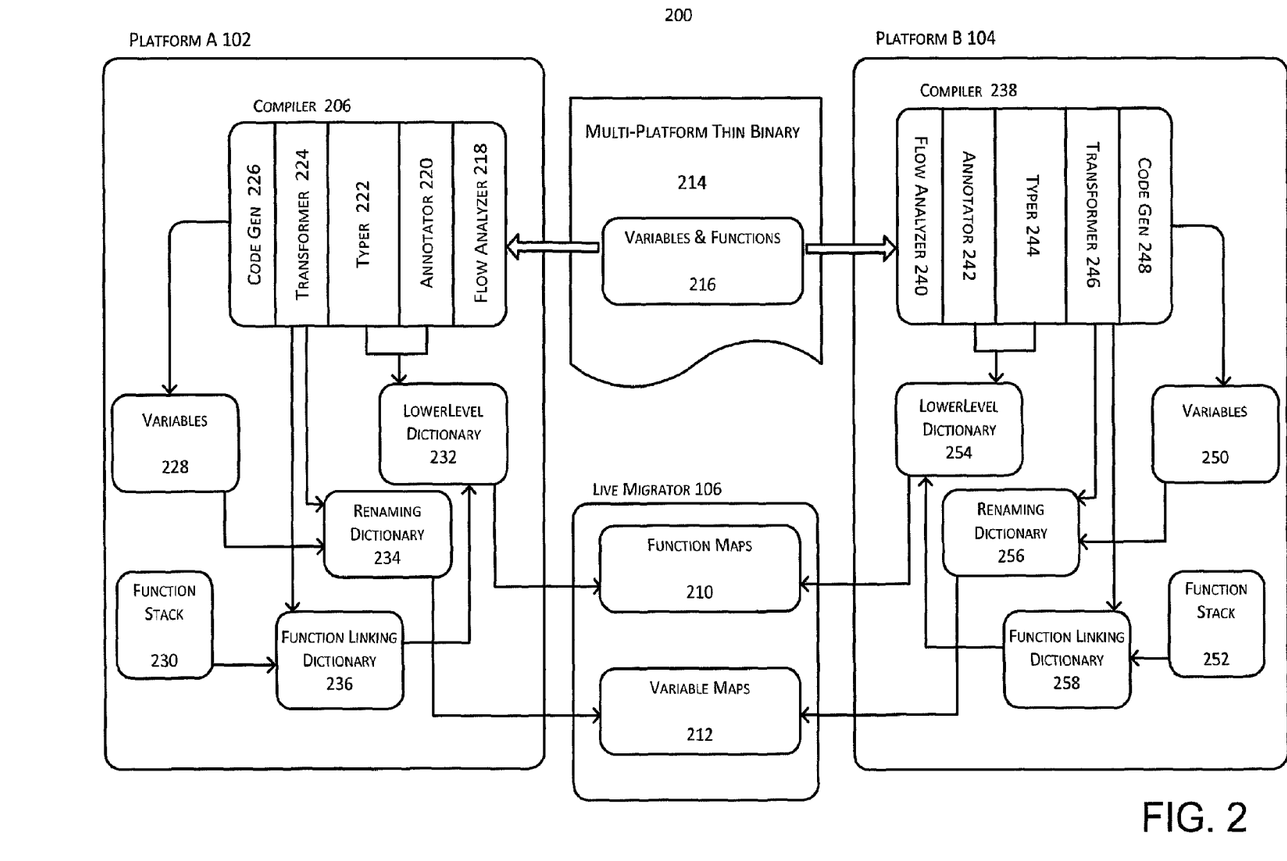
FIG. 2 shows a block diagram illustrating an example data flow for migrating executing processes, arranged in accordance with at least some embodiments described herein.

FIG. 2 shows a block diagram 200 illustrating an example data flow for migrating executing processes, arranged in accordance with at least some embodiments described herein. As depicted, block diagram 200 depicts migrating at least a process of an application or program that is currently executing on platform A 102 to platform B 104. In accordance with the example embodiments described herein, platform A 102 and platform B 104 utilize different ISAs, and live migrator 106 may facilitate live migration of an executing process of an application or program from one of platform A 102 and platform B 104 to the other. For the purpose of explanation by way of example only, the following description pertains to the live migration of an executing process from platform A 102 to platform B 104, although the migration could be reversed based on the same description.

As depicted in FIG. 2, platform A 102 may include, at least, a compiler 206, a variables table 228, a function stack 230, a lower level dictionary 232, a renaming dictionary 234, and a function linking dictionary 236.

Compiler 206, which may be configured as a JIT compiler, may include multiple components that include, but are not limited to, a flow analyzer 218, an annotator 220, a Typer 222, a transformer 224, and a code generator 226.

Live migrator 106 may refer to an application or program that may be configured, programmed, or otherwise designed to map variables and address stacks of an intermediate representation of at least a process from an application or program, from both the source ISA and the destination or target ISA, into a labeled form thereof. Accordingly, live migrator 106 may be further configured, programmed, or otherwise designed to map the labeled form of the variables and address stacks onto the destination instruction set architecture. Live migrator 106 may be configured, programmed, or otherwise designed to receive, store, and output function maps 210 and variable maps 212, which may facilitate mapping variables and address stacks from the source ISA into a labeled form, and then onto the destination or target ISA.

Multi-platform thin binary 214 may refer to at least a process of an application or program that may be delivered to and executed on a respective ISA of both platform A 102, e.g., x86 system, and platform B 104, e.g., ARM system.

Variables and functions 216 may refer to one or more tables of variables and functions that are called during execution of multiplatform thin binary 214. Variables may refer to programming structures that hold data until a new value is assigned or the application or program completes execution. Variables may be local, referenced only within a process, or variables may be global, referenced through an entire application or program. Functions may refer to self-contained routines to perform a particular task within the application or program. Further, functions may execute multiple times within the application or program and, further still, may even be called for by other applications or programs. As referenced herein, variables and functions 216 may refer to one or more tables, or collections of adjacent fields, of variables and functions that may be called during execution of the thin binary 214 representation of the application or program.

Flow analyzer 218 may be configured, programmed, or otherwise designed to break at least the process of the application or program represented by multiplatform thin binary 214 into a sequence of blocks, as part of a JIT compiling process. The blocks may be utilized to determine parts of the process of the application or program to load or unload in memory in order to track optimizations. That is, flow analyzer 218 may analyze a flow of control inside a process or method, or particular sections thereof, so that code paths may be rearranged to improve processing efficiency. Non-limiting examples of an analysis projected onto one or more of the blocks, which may be regarded as sections of the application or program that are divided into smaller segments for analysis and optimization, may include calls for one or more blocks to be reordered, split, and/or removed.

Annotator 220 may be configured, programmed, or otherwise designed to perform type inference to annotate each variable that appears to describe possible types of data that a variable may contain at run time. Thus, annotator 220 may produce lower level dictionary 232 to facilitate mapping of functions to annotations.

Typer 222 may be configured, programmed, or otherwise designed to take annotations from annotator 220 and to thereby form declarative variable formats that become pointers. Thus, annotator 220 and Typer 222 together produce lower level dictionary 232, which may facilitate mapping of functions to annotations. To produce lower level dictionary 232, Typer 222 may determine an appropriate low-level type for each annotation, and further replace each high-level operation with one or more low-level operations.

Transformer 224 may be configured, programmed, or otherwise designed to transform the blocks and produce renaming dictionary 234, particularly to implement backend optimizations that may result in a compiled application or program executing quickly and efficiently on a host ISA. Renaming dictionary 234 may facilitate renaming of variable objects from annotator 220 and Typer 222 by identifying variables based on a corresponding memory address. To transform the blocks, transformer 224 may implement function inlining which may include inserting a copy of a flow graph of the application or program into a graph of a corresponding calling function; and renaming dictionary 234 may be produced as a result thereof, as occurring variables may be renamed as appropriate.

Code generator 226 may be configured, programmed, or otherwise designed to generate the compiled machine language, including variables stored in variables table 228, which may be executed on the ISA corresponding to platform A 102 at runtime.

As depicted in FIG. 2, similar to platform A 102, platform B 104 may include, at least, a compiler 238, a variables table 250, a function stack 252, a lower level dictionary 254, a renaming dictionary 256, and a function linking dictionary 256.

The description of compiler 238 is similar to that of compiler 206, and is provided below to maintain proper correspondence of reference numbers.

Compiler 238, which may be configured as a JIT compiler, may include multiple components that include, but are not limited to, a flow analyzer 240, an annotator 242, a Typer 244, a transformer 246, and a code generator 248.

Flow analyzer 240 may be configured, programmed, or otherwise designed to break at least the process of the application or program represented by multiplatform thin binary 214 into a sequence of blocks, as part of the JIT compiling process. The blocks may be utilized to determine parts of the application or program to load or unload in memory in order to track optimizations. That is, flow analyzer 240 may analyze a flow of control inside a process or method, or particular sections thereof, so that code paths may be rearranged to improve processing efficiency. Non-limiting examples of an analysis projected onto one or more of the blocks, which may be regarded as sections of the application or program that are divided into smaller segments for analysis and optimization, may include calls for one or more blocks to be reordered, split, and/or removed.

Annotator 242 may be configured, programmed, or otherwise designed to perform type inference to annotate each variable that appears to describe possible types of data that a variable may contain at run time.

Typer 244 may be configured, programmed, or otherwise designed to take annotations from annotator 242 and to thereby form declarative variable formats that become pointers. Thus, annotator 242 and Typer 244 together produce lower level dictionary 254, which may facilitate mapping of functions to annotations. To produce lower level dictionary 254, Typer 222 may determine an appropriate low-level type for each annotation, and further replace each high-level operation with one or more low-level operations.

Transformer 246 may be configured, programmed, or otherwise designed to transform the blocks and produce renaming dictionary 256, particularly to implement backend optimizations that may result in a compiled application or program executing quickly and efficiently on a host ISA. Renaming dictionary 256 may facilitate renaming of variable objects from annotator 242 and Typer 244. To transform the blocks, transformer 246 may implement function inlining which may include inserting a copy of a flow graph of the application or program into a graph of a corresponding calling function; and renaming dictionary 256 may be produced as a result thereof, as occurring variables may be renamed as appropriate.

Code generator 248 may be configured, programmed, or otherwise designed to generate the compiled machine language, including variables stored in variables table 250, which may be executed on the ISA corresponding to platform B 104 at runtime.

Both compiler 206 and compiler 238 are described with reference to JIT compilers, although the example embodiments of migrating executing processes may contemplate non-JIT compilers as well.

In the context of framework 100, example implementations of migrating executing processes may include executing at least the process of the application or program represented by multiplatform thin binary 214 on a source instruction set architecture, e.g., platform A 102; compiling the process to produce an intermediate representation of the process on both the source instruction set architecture and a destination instruction set architecture; mapping variables and address stacks of the intermediate representation of the process from both the source instruction set architecture and the destination instruction set architecture into a labeled form thereof; and mapping the labeled form of the variables and address stacks onto the destination instruction set architecture.

Further example implementations of migrating executing processes may include JIT compiling a process as it runs on a first instruction set architecture, generating a function map for at least some functions of the process, generating a variable map for at least some variables of the process, mapping the functions from the function map to a function stack of the process, and mapping the variables from the variable map to corresponding addresses of the process.

Figure 3:
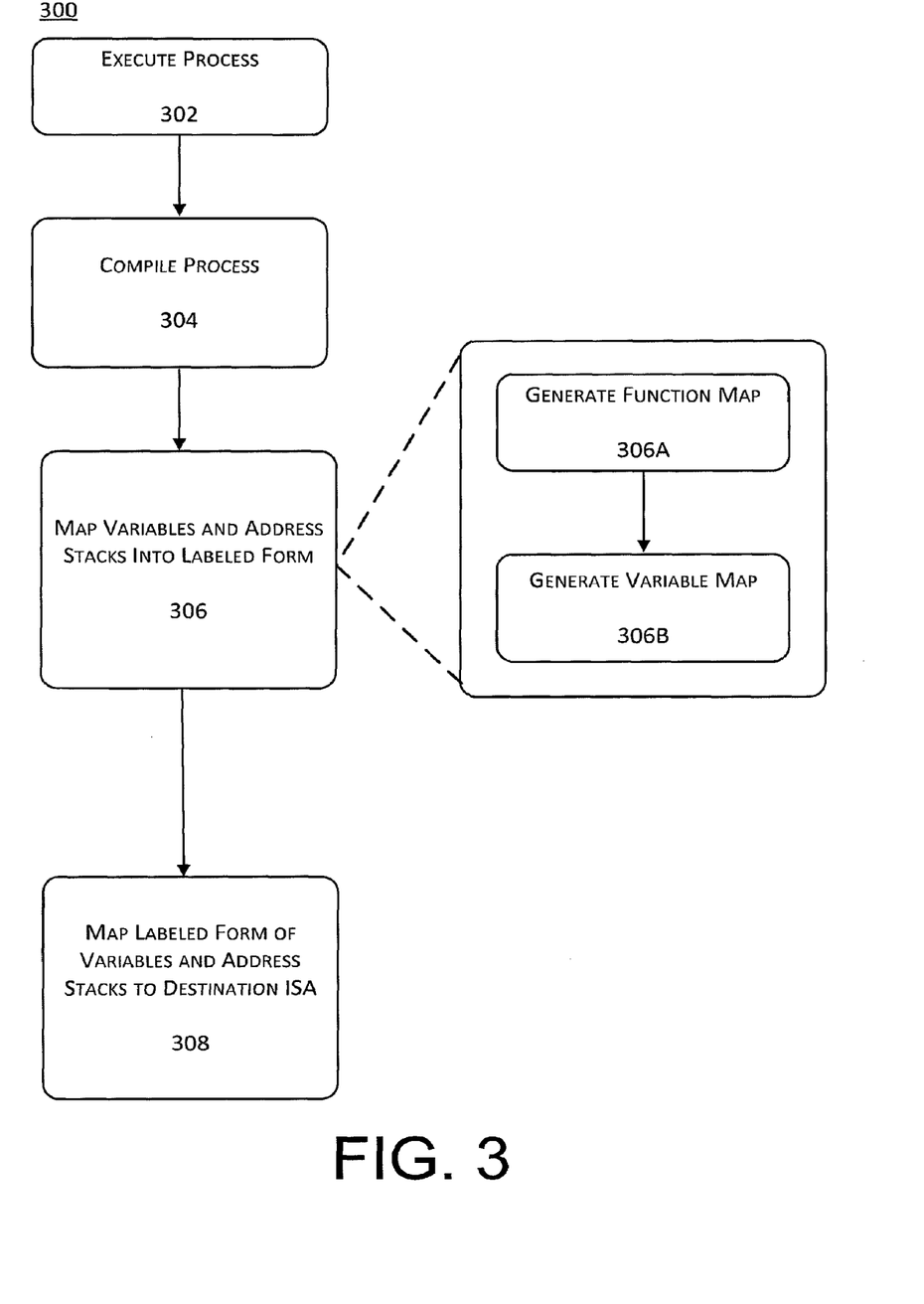
FIG. 3 shows an example processing flow, and sub-flows, of operations for migrating executing processes, arranged in accordance with at least some embodiments described herein.

FIG. 3 shows an example processing flow 300, including a sub-flow, of operations for migrating executing processes. Processing flow 300 may include one or more operations, actions, or functions depicted by one or more blocks 302, 304, 306, and 308, with reference to the features and/or components of framework 100 and block diagram 200. Further, block 306 may be further described with regard to the sub-flow of operations, actions, or functions depicted by one or both of blocks 306A and 306B. Further, processing flow 300 is described below in the context of an example embodiment by which at least a process of an application or program is currently executed on platform A 102 is live migrated to platform B 102, with different ISAs implemented on each platform. Although illustrated as discrete blocks, various blocks may be divided into additional blocks, combined into fewer blocks, or eliminated, depending on the desired implementation. Processing flow 300 may start at block 302.

Block 302 (Execute Process) may refer to at least a process of an application or program being executed on either of platform A 102 or platform B 104. More particularly, block 302 may refer to at least a thin binary of a process of an application or program being executed in accordance with an ISA of platform A 102. Processing flow 300 may proceed from block 302 to block 304.

Block 304 (Compile Process) may refer to at least the process of the application or program being compiled, e.g., JIT compiled, in accordance with the ISA of platform A 102 and in accordance with the ISA of the destination or target ISA of platform B 104. Accordingly, in accordance with the ISA corresponding to first platform A 102, compiler 206 may populate a table that stores variables 228 corresponding to the compiled thin binary, as well as function stack 230 that stores the functions corresponding to the compiled thin binary. Similarly, in accordance with the ISA corresponding to second platform B 104, compiler 238 may populate a table that stores variables 250 corresponding to the compiled thin binary, as well as function stack 252 that stores the functions corresponding to the compiled thin binary. Processing flow 300 may proceed from block 304 to block 306.

Block 306 (Map Variables and Address Stacks into Labeled Form) may refer to the dereferencing of function addresses and a function stack for at least the process of the thin binary of the application or program executing on both first platform A 102 and second platform B 104, and providing the resulting function maps 210 to live migrator 106. Block 306 may further refer to the dereferencing of variable addresses for at least the process of the thin binary of the application or program executing on both first platform A 102 and second platform B 104, and providing the resulting variable maps 212 to live migrator 106. Live migrator 106 may be configured, programmed, or otherwise designed to connect the stored function maps 210 and variable maps 212 to functions and variables corresponding to the thin binary representation of at least the process represented by thin binary 214. Processing of block 306 may start at sub-block 306A.

Sub-block 306A (Generate Function Map) may refer to, with regard to first platform A 102, function addresses from the table of variables 228 and function stack 230 being indirection dereferenced through function linking dictionary 236 and lower level dictionary 232 to yield function maps that are directed into the table of function maps 210 on live migrator 106. Sub-block 306A may further refer to, with regard to second platform B 104, function addresses from the table of variables 250 and function stack 252 being indirection dereferenced through function linking dictionary 258 and lower level dictionary 254 to yield function maps that are also directed into the table of function maps 210 on live migrator 106. Function linking dictionaries 236 and 258 may be configured or designed to identify functions from function stacks 230 and 252, respectively. Lower level dictionaries 232 and 254 may be configured or designed to produce function maps, given the input of function linking dictionaries 236 and 258, respectively.

Sub-block 306B (Generate Variable Map), with regard to first platform A 102, may refer to variable addresses from the table of variables 228 being indirection dereferenced through lower level dictionary 232 and renaming dictionary 234 to yield a list of addresses by original code variable name to produce variable maps that are directed to the table of variable maps 212 on live migrator 106. Sub-block 306B, with regard to second platform B 104, may further refer to variable addresses from the table of variables 250 being indirection dereferenced through lower level dictionary 254 and renaming dictionary 256 to yield a list of addresses by original code variable name to produce variable maps that are also directed to the table of variable maps 212 on live migrator 106. Further, since second platform B 104 implements the destination or target ISA, renaming dictionary 256 may provide a memory location of named variables from the table of variables and functions 216 corresponding to the multi-platform thin binary 214 of at least the process of the application or program to be live migrated. Processing flow 300 may proceed from block 306 to block 308.

Block 308 (Map Labeled Form of Variables and Address Stacks to Destination ISA) may refer to connecting the named variables and functions 216 corresponding to the thin binary of at least the process of the application or program executing on platform A 102 with their equivalent pointers and addresses on both platform A 102 and platform B 104, subsequent to the JIT compiling thereof.

More particularly, block 308 may refer to, with regard to the destination or target ISA implemented on second platform A 104, connecting the named variables and functions provided in the table of variables and functions 216 corresponding to the multi-platform thin binary 214 of at least the process of the application or program to be live migrated, respectively, to variables maps 212 and function maps 210. Some form of translation may also be applied as appropriate between the first and second ISA, such as changing variable bit width or converting number representations from big endian to little endian.

As a result of processing flow 300 depicted in FIG. 3, the dereferencing facilitated by the JIT compiling of the thin binary on both first platform A 102 and second platform B 104, live migrator 106 facilitates the transfer of state, including function stacks, from the source ISA to the destination or target ISA by leveraging function maps 210 and variable maps 212. Thus, the ISA of both first platform A 102 and second platform B 104 are prepared for cross-migration of at least the process of the application or program represented by multi-platform thin binary 214.

Figure 4:
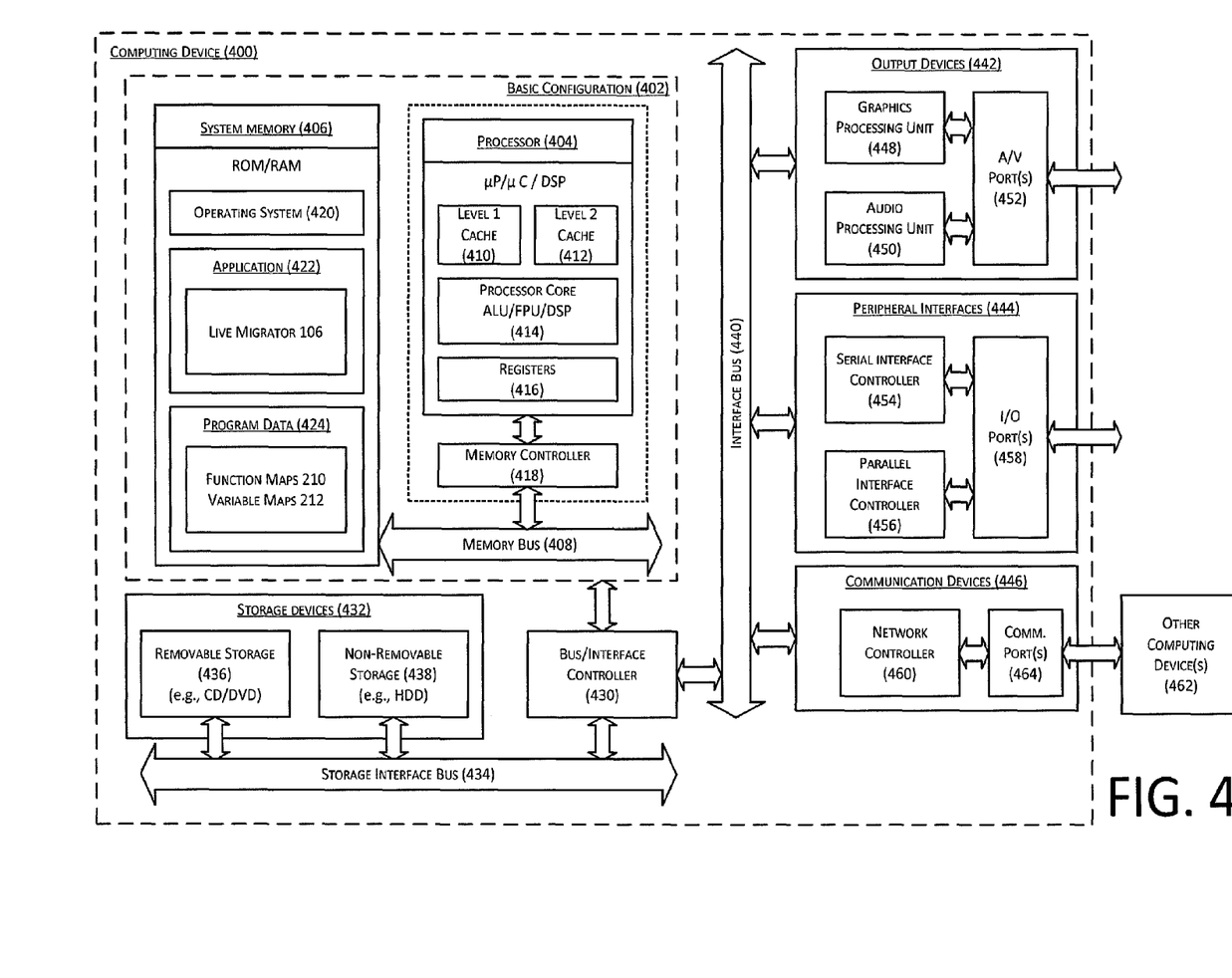
FIG. 4 shows a block diagram illustrating an example computing device by which various example solutions described herein may be implemented, arranged in accordance with at least some embodiments described herein.

FIG. 4 shows a block diagram illustrating an example computing device by which various example solutions described herein may be implemented, arranged in accordance with at least some embodiments described herein.

In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include live migrator 106 that is configured to coordinate the functions as described herein including those described with respect to processing flow 300 of FIG. 3. Program data 424 may include function maps 210 and variable maps 212 that may be utilized by the components or modules invoked by live migrator 106 as described herein. Application 422 may be arranged to operate with program data 424 on operating system 420 such that implementations of migrating executing processes may be implemented as described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 544 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs executing on one or more computers, e.g., as one or more programs executing on one or more computer systems, as one or more programs executing on one or more processors, e.g., as one or more programs executing on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium, e.g., a fiber optic cable, a waveguide, a wired communications link, a wireless communication link, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., " a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., " a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method of live migration in a datacenter, wherein the method is performed under control of at least one hardware processor that is configured to execute instructions stored in a memory, the method comprising:

executing a process on a source instruction set architecture;

just-in-time (JIT) compiling the process,
wherein the JIT compiling includes:
performing a first JIT compilation of the process on the source instruction set architecture to generate a thin binary of the process, source variables, and function stacks of functions utilized by the thin binary on the source instruction set architecture;
storing, in accordance with the source instruction set architecture, the source variables and the function stacks of functions utilized by the thin binary on the source instruction set architecture;
performing a second JIT compilation of the process on a destination instruction set architecture to generate destination variables and function stacks of functions utilized by the thin binary on the destination instruction set architecture;
storing, in accordance with the destination instruction set architecture, the destination variables and the function stacks of functions utilized by the thin binary on the destination instruction set architecture; and
mapping the source and destination variables and address stacks of the thin binary from both the source instruction set architecture and the destination instruction set architecture into a labeled form by performing:
indirection dereferencing of source function addresses, from the function stacks of functions for the thin binary that executes on the source instruction set architecture, into a first lower level dictionary of the source instruction set architecture;
indirection dereferencing of source variable addresses, from the source variables for the thin binary that executes on the source instruction set architecture, into the first lower level dictionary of the source instruction set architecture;
indirection dereferencing of destination function addresses, from the function stacks of functions for the thin binary that executes on the destination instruction set architecture, into a second lower level dictionary stored on the destination instruction set architecture;
indirection dereferencing of destination variable addresses, from the destination variables for the thin binary that executes on the destination instruction set architecture, into the second lower level dictionary stored on the destination instruction set architecture; and
mapping, into the labeled form, the source function addresses and the source variable addresses to equivalent destination function addresses and destination variable addresses, and storing the mapped labeled form in a live migrator; and
migrating the thin binary between the source instruction set architecture and the destination instruction set architecture using the mapped labeled form,
wherein the mapping the source and destination variables and the address stacks of the thin binary facilitates transfer of state of the process, from the source instruction set architecture to the destination instruction set architecture, for migration of the thin binary between the source instruction set architecture and the destination instruction set architecture, using the mapped labeled form.

2. The method of claim 1, wherein the mapping the source and destination variables and the address stacks includes mapping names of variables and names of functions to objects thereof in respective low level databases of a JIT compiler.

3. The method of claim 1, wherein the source instruction set architecture includes an X86 instruction set architecture, and wherein the destination instruction set architecture includes an advanced reduced instruction set computer (RISC) machine (ARM) instruction set architecture.

4. The method of claim 1, wherein the source instruction set architecture and the destination instruction set architecture correspond to a common datacenter.

5. A non-transitory computer-readable medium that stores executable instructions that, in response to execution, cause a virtual machine manager to perform or control performance of operations comprising:
executing a process on a source instruction set architecture;
just-in-time (JIT) compiling the process, wherein the JIT compiling includes:
performing a first JIT compilation of the process on the source instruction set architecture to generate a thin binary of the process, source variables, and function stacks of functions utilized by the thin binary on the source instruction set architecture;
storing, in accordance with the source instruction set architecture, the source variables and the function stacks of functions utilized by the thin binary on the source instruction set architecture;
performing a second JIT compilation of the process on a destination instruction set architecture to generate destination variables and function stacks of functions utilized by the thin binary on the destination instruction set architecture;
storing, in accordance with the destination instruction set architecture, the destination variables and the function stacks of functions utilized by the thin binary on the destination instruction set architecture; and
mapping source and destination variables and address stacks of the thin binary from both the source instruction set architecture and the destination instruction set architecture into a labeled form by performing:
indirection dereferencing of source function addresses, from the function stacks of functions for the thin binary that executes on the source instruction set architecture, into a first lower level dictionary of the source instruction set architecture;
indirection dereferencing of source variable addresses, from the source variables for the thin binary that executes on the source instruction set architecture, into the first lower level dictionary of the source instruction set architecture;
indirection dereferencing of destination function addresses, from the function stacks of functions for the thin binary while executing on the destination instruction set architecture, into a second lower level dictionary stored on the destination instruction set architecture;
indirection dereferencing of destination variable addresses, from the destination variables for the thin binary while executing on the destination instruction set architecture, into the second lower level dictionary stored on the destination instruction set architecture; and
mapping, into a labeled form, the source function addresses and the source variable addresses to equivalent destination function addresses and destination variable addresses, and storing the mapped labeled form in a live migrator; and migrating the thin binary between the source instruction set architecture and the destination instruction set architecture using the mapped labeled form, wherein the mapping the source and destination variables and the address stacks of the thin binary facilitates transfer of state of the process, from the source instruction set architecture to the destination instruction set architecture, for migration of the thin binary between the source instruction set architecture and the destination instruction set architecture, using the map labeled form.

6. A live migrator, comprising:

means for executing a process on a source instruction set architecture;

means for just-in-time (JIT) compiling the process, wherein means for JIT compiling the process includes:

means for performing a first JIT compilation of the process on the source instruction set architecture to generate a thin binary of the process, source variables, and function stacks of functions utilized by the thin binary on the source instruction set architecture;

means for storing, in accordance with the source instruction set architecture, the source variables and the function stacks of functions utilized by the thin binary on the source instruction set architecture;

means for performing a second JIT compilation of the process on a destination instruction set architecture to generate destination variables and function stacks of functions utilized by the thin binary on the destination instruction set architecture;

means for storing, in accordance with the destination instruction set architecture, the destination variables and the function stacks of functions utilized by the thin binary on the destination instruction set architecture; and means for mapping the source and destination variables and address stacks of the thin binary from both the source instruction set architecture and the destination instruction set architecture into a labeled form, wherein the means for mapping comprises:

means for indirection dereferencing source function addresses, from the function stacks of functions for the thin binary that executes on the source instruction set architecture, into a first lower level dictionary of the source instruction set architecture;

means for indirection dereferencing source variable addresses, from the source variables for the thin binary that executes on the source instruction set architecture, into the first lower level dictionary of the source instruction set architecture;

means for indirection dereferencing destination function addresses, from the function stacks of functions for the thin binary that executes on the destination instruction set architecture, into a second lower level dictionary stored on the destination instruction set architecture;

means for indirection dereferencing destination variable addresses, from the destination variables for the thin binary that executes on the destination instruction set architecture, into the second lower level dictionary stored on the destination instruction set architecture; and means for mapping, into a labeled form, the source function addresses and the source variable addresses to equivalent destination function addresses and destination variable addresses and storage of the mapped labeled form in the live migrator; and means for migrating of the thin binary between the source instruction set architecture and the destination instruction set architecture by use of the mapped labeled form, wherein the map of the source and destination variables and the address stacks of the thin binary facilitates transfer of state of the process, from the source instruction set architecture to the destination instruction set architecture, for migrating the thin binary between the source instruction set architecture and the destination instruction set architecture, using the map labeled form.

7. The live migrator of claim 6, wherein:

the JIT compilation of the process includes production of an intermediate representation of the process on both the source instruction set architecture and the destination instruction set architecture, and the map of the source and destination variables and the address stacks includes a map of variables and address stacks of the intermediate representation of the process from both the source instruction set architecture and the destination instruction set architecture into the labeled form thereof.

8. A live migrator, comprising:

a processor to execute a process on a source instruction set architecture; and a just-in-time (JIT) compiler to JIT compile the process, wherein the JIT compilation of the process includes:

performance of a first JIT compilation of the process on the source instruction set architecture to generate a thin binary of the process, source variables, and function stacks of functions utilized by the thin binary on the source instruction set architecture;

storage of, in accordance with the source instruction set architecture, the source variables and the function stacks of functions utilized by the thin binary on the source instruction set architecture;

performance of a second JIT compilation of the process on a destination instruction set architecture to generate destination variables and function stacks of functions utilized by the thin binary on the destination instruction set architecture;

storage of, in accordance with the destination instruction set architecture, the destination variables and the function stacks of functions utilized by the thin binary on the destination instruction set architecture; and map of the source and destination variables and address stacks of the thin binary from both the source instruction set architecture and the destination instruction set architecture into a labeled form by performance of:

indirection dereference of source function addresses, from the function stacks of functions for the thin binary that executes on the source instruction set architecture, into a first lower level dictionary of the source instruction set architecture;

indirection dereference of source variable addresses, from the source variables for the thin binary that executes on the source instruction set architecture, into the first lower level dictionary of the source instruction set architecture;

indirection dereference of destination function addresses, from the function stacks of functions for the thin binary that executes on the destination instruction set architecture, into a second lower level dictionary stored on the destination instruction set architecture;

indirection dereference of destination variable addresses, from the destination variables for the thin binary while executing on the destination instruction set architecture, into the second lower level dictionary stored on the destination instruction set architecture; and map, into a labeled form, the source function addresses and the source variable addresses to equivalent destination function addresses and destination variable addresses and storage of the mapped labeled form in the live migrator, wherein the processor is configured to migrate of the thin binary between the source instruction set architecture and the destination instruction set architecture by use of the mapped labeled form, and wherein the map of the source and destination variables and the address stacks of the thin binary facilitates transfer of state of the process, from the source instruction set architecture to the destination instruction set architecture, for migration of the thin binary between the source instruction set architecture and the destination instruction set architecture, using the map labeled form.

* * * * *